W. J. BIEGEL.
CARBURETER HEATING DEVICE.
APPLICATION FILED FEB. 18, 1918.
1,283,054.
Patented Oct. 29, 1918.
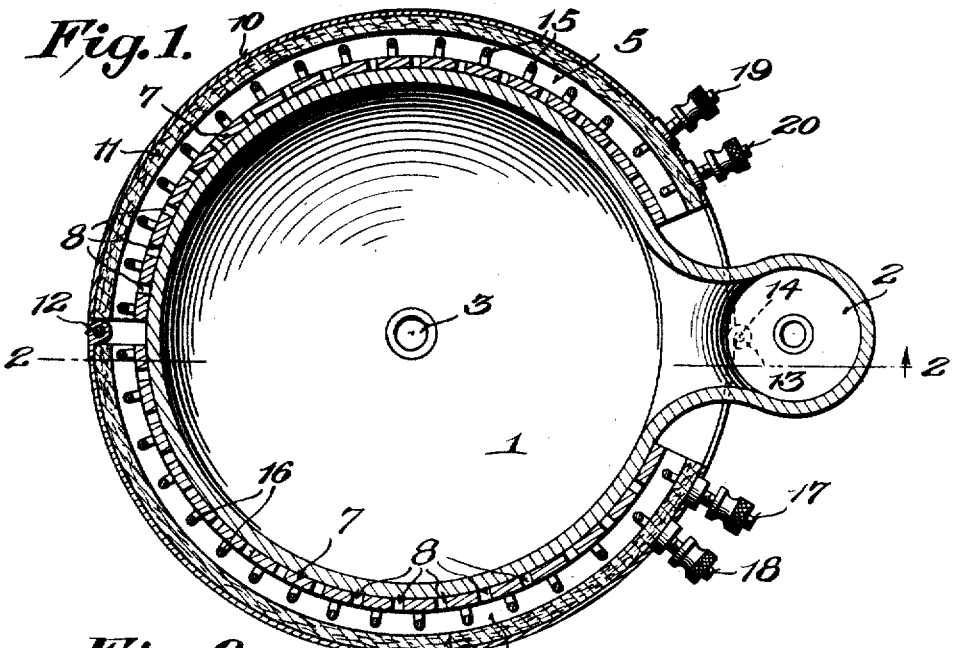
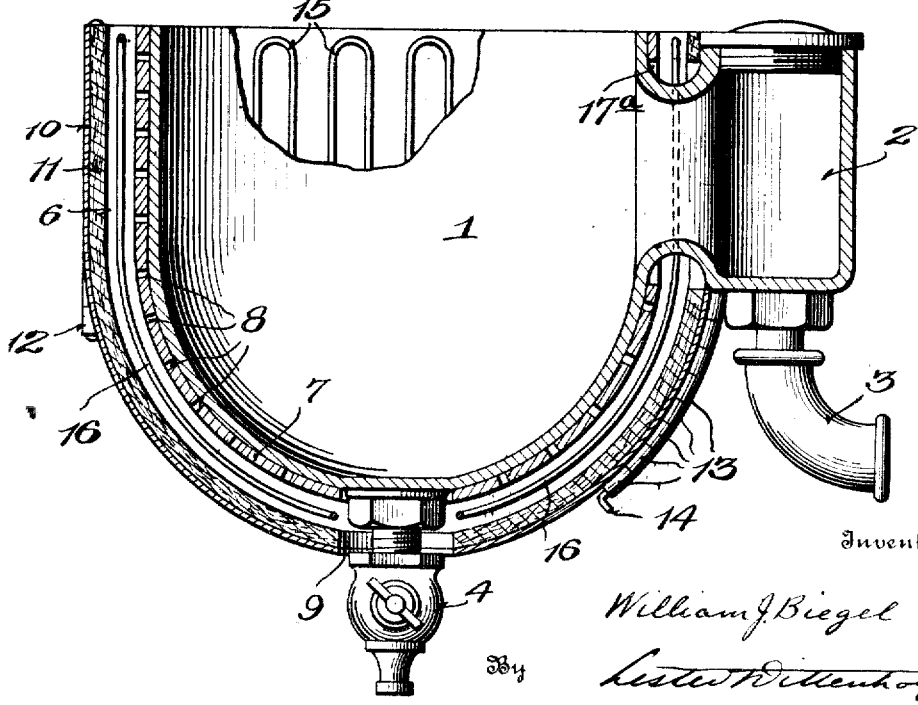
Inventor
William J Biegel
By Lester W Dittenhofer
Attorney

UNITED STATES PATENT OFFICE.

WILLIAM J. BIEGEL, OF NEW YORK, N. Y., ASSIGNOR OF ONE-THIRD TO ABRAM J. DITTENHOEFER, OF NEW YORK, N. Y.

CARBURETER-HEATING DEVICE.

1,283,054.

Specification of Letters Patent.

Patented Oct. 29, 1918.

Application filed February 18, 1918. Serial No. 217,782.

*To all whom it may concern:*

Be it known that I, WILLIAM J. BIEGEL, a citizen of the United States, residing at the borough of Bronx, in the city of New York, Bronx county, and State of New York, have invented certain new and useful Improvements in Carbureter-Heating Devices, of which the following is a specification.

This invention relates to certain new and useful improvements in carbureter heating devices, and pertains more particularly to a heating device which is adapted to heat the carbureter bowl from the exterior thereof by being applied over and around the same.

The primary object of the invention is to provide a heating device which can be applied to any type of bowl without altering or in any way modifying the latter.

Further, the invention aims to provide a heating device which is placed about the exterior of the bowl in position ready for electrical connections to be formed so as to supply heat, and to also provide a device of this type which can be easily and quickly applied to the bowl and removed for any desired purpose.

In the drawing:

Figure 1, is a horizontal sectional view taken through a carbureter bowl and showing the present invention applied thereto; and Fig. 2, is a vertical sectional view on line 2—2 of Fig. 1.

It will be understood that the invention is designed to be applied to any type of bowl, the one depicted in the drawings and indicated by reference numeral 1, being of somewhat common form, and provided with the usual valve chamber 2, intake gasolene pipe 3, and pet drain cock 4.

The invention embodies two parts or sections 5 and 6 which are hinged and which fold around the bowl so as to enable the ready and easy application thereof to the bowl and like removal.

Each section is composed of an inner plate 7 formed with a plurality of perforations 8, so as to provide a foraminous formation. The plates 7 are shaped to conform to that of the bowl so as to engage around the sides and bottom thereof and have cut-out parts 9 so as to receive the pet cock 4. The sections each have an outer plate 10, the latter faced with an asbestos or other heat insulating sheet 11, for the purpose of confining the heat to the bowl and to prevent radiation thereof. The two sections 5 and 6 are hingedly connected at 12, at their outer ends, while their inner ends are provided with registering eyes or knuckles 13 adapted to slidably and removably receive a locking pin 14, the knuckles and pin being conformed in general shape to that of the adjacent under part of the bowl, as illustrated in Fig. 2.

For the purpose of heating the bowl two series of wires 15 and 16 are employed, one series for each section, two series being employed due to the hinged connection between the sections. These wires are arranged as shown in Fig. 2, in which the wires are of U-shape or loop formation and connected at the alternate ends of the U's. The ends of the two wires 15 and 16 are connected to terminal binding posts 17 and 18, and 19 and 20 respectively, suitable connections being made with said binding posts from any source of electrical supply for the purpose of heating the wires or coils 15 and 16.

It will be understood of course that the two sections are differently conformed when the carbureter bowl varies in shape from that illustrated in the present drawings, the shape of the sections being thus controlled by the shape of the bowl.

From the foregoing it will be thus apparent that in applying the device, same is simply wrapped around the bowl, and the ends of the sections are brought together to a position where the eye or knuckles 13, register, following which the pin 14 is slid into and through the knuckles, thus holding the sections locked against removal. The sections are preferably provided with cutout parts 17*, so as to receive the valve chamber 2.

What is claimed is:

1. A carbureter bowl heating device composed of a pair of hingedly connected sections, each section being composed of a pair of spaced plates conformed to the shape of the bowl so as to engage around and beneath the latter in close conformation to the contour thereof, the inner plates being perforated and the outer plates being faced with asbestos, means to secure the sections against hinging so as to lock same in position around the bowl, heating wires in each section between the perforated plates and the asbestos, and a pair of binding posts for each of the wires.

2. A carbureter bowl heating device composed of a pair of hingedly connected sections, each section being composed of a pair of spaced plates conformed to the shape of the bowl so as to engage around and beneath the latter in close conformation to the contour thereof, said sections being provided with registering eyes adapted to removably receive a locking pin so as to lock the sections in position around the bowl, and an electric heating wire in each section.

WILLIAM J. BIEGEL.